Sept. 10, 1957      J. J. DYMON      2,806,189

ALKALINE TITANATE RECTIFIERS

Filed July 3, 1953

INVENTOR
JOSEPH J. DYMON
BY
ATTORNEY

United States Patent Office 2,806,189
Patented Sept. 10, 1957

2,806,189
ALKALINE TITANATE RECTIFIERS

Joseph J. Dymon, Flushing, N. Y., assignor to Sylvania Electric Products Inc., a corporation of Massachusetts Application July 3, 1953, Serial No. 365,987

22 Claims. (Cl. 317—237)

This invention deals with crystal rectifiers of the point contact or area contact type. More particularly, it relates primarily to rectifiers made from alkaline earth metal titanates and the method of processing them.

It has recently been established that alkaline earth metal titanates can be processed to produce crystal rectifiers. Application Serial Number 341,790 filed in the name of Harry Dunegan describes a method of making the basic titanate material while application Serial Number 341,726 filed in the name of J. Dymon describes a titanate rectifier with an improved barrier material of lead peroxide. While these materials as therein described exhibit rectifying properties their rectification ratios could be improved upon.

It is, accordingly, an object of this invention to develop an alkaline titanate rectifier of improved rectifying characteristics.

It is a further object of this invention to develop a titanate rectifier which is relatively inexpensive and which may be processed by simple means to make useful point contact and area contact type rectifiers.

It is a still further object of this invention to develop alkaline titanate rectifiers of the foregoing type which under proper operating conditions will stand exceptionally high operating voltages and high operating currents so that when properly used they exhibit advantages over existing fixed rectifying devices.

In accordance with this invention these and other advantages which are incidental to their application can be obtained with reduced titanates of the alkaline earth metals to which a double layer of metallic oxide has been applied.

In the accompanying drawings which illustrate preferred forms of devices embodying features of this invention Figure 1 is a perspective view partly in section showing an embodiment of a rectifier of this invention.

As has been set forth in the prior art it has been found that when alkali metal titanates are fired in a strongly reducing atmosphere through vitrification the resistivities of the ceramic materials obtained are on the order of ohm centimeters and the fully reduced material exhibits non-linear characteristics. It has, of course, been recognized that if a barrier layer is then formed by superficial oxidation of the surface the system functions as an efficient rectifier. It has, however, been further found that rectifiers which at best exhibited breakdown voltages in the neighborhood of 40 volts could be improved to yield breakdown voltages in the neighborhood of 75 to 110 volts D. C. This effect is achieved when layers which had been applied electrolytically in the form of an oxide of a metal such as lead are additionally coated with a further coating of the metal oxide applied in some mechanical manner, as, for example, by coacting the surface with a coat of lead dioxide which has been intimately mixed with a binder which can withstand heat. This latter coating can, for example, be applied by a brushing, spray or dip technique.

Figure 1:
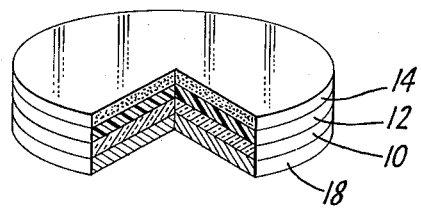
Figure 2:
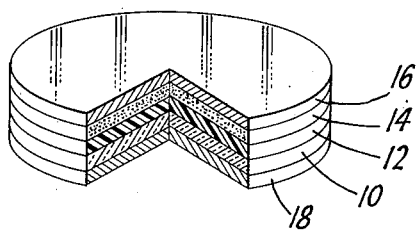
Figure 2 is a perspective view partly in section of an area type rectifier.
Figure 3:
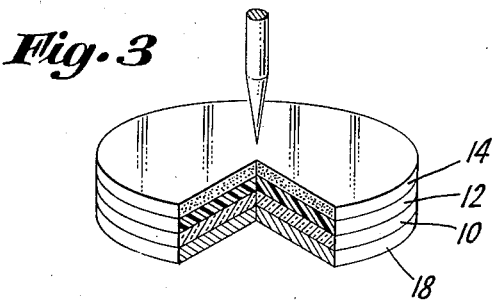
Figure 3 is a perspective view partly in section of a point contact type rectifier.

In Figure 1 of the drawings 10 represents a reduced titanate of an alkaline earth metal, 12 represents an oxide coating on the top surface of the reduced titanate which has been applied electrolytically, and 14 represents a metal oxide coating which has been applied in paste form. An additional layer 16 which is superimposed on the top oxide layer represents a counter electrode material. Layer 18 is also an electrode material of a very similar nature to the counter electrode 16 but it is applied on the bottom layer of the ceramic titanate disc 10.

The general method of preparation of the disc 10 involves the formation of a part or sheet by compression of an alkaline earth metal titanate powder. The formed pellet is then fired in a clean, dry, inert or reducing atmosphere at temperatures on the order of 200° to 2600° F. and then permitted to cool in such clean atmosphere.

Specifically, the method of preparation of these various rectifying materials is subject to a number of preferred variations which will be described in detail. Titanates of calcium, strontium and barium in their mixtures with one another are available commercially in the form of fully reactive ceramic powders having a particle size in the range of 3 to 10 microns. These are formed into shape from a mixture consisting of 100 parts of any of the powder titanates, ten parts of a 15% solution of polyvinyl alcohol. Other tempering agents such as ethyl cellulose in the form of a 2% solution may conveniently be used; in cases where the organic material creates a problem with respect to maintaining reasonably clean furnace atmosphere, water alone is suitable. The advantages of such agents as polyvinyl alcohol and methyl cellulose is to provide sufficient strength so that the green pieces may be handled without fear of breaking prior to their insertion into the furnace. The pellets are then pressed with pressure of the order of 4000 to 8000 lbs. per square inch. After being dried at room temperature for a period of 24 hours they are placed inside saggers whose interior is lined with a smooth surface of powdered barium zirconate. The function of the barium zirconate is to prevent reaction between the titanate material and the sagger material at the elevated temperatures to which the devices are fired. The pieces are then fired in a hydrogen furnace at temperatures at the order of 2000 to 2600° F. and are maintained at this top temperature for a period of three hours. Clean pure hydrogen is used.

The titanate rectifying materials may also be prepared with the use of doping agents such as lanthanum. Amounts of lanthanum up to 5% have been used successfully for this purpose. It has been found that when the lanthanum doping agent is used it is possible to replace part of the hydrogen in the furnace with helium. This is of some importance in the processing steps since the addition of helium helps to cut down the amount of water vapor which would normally be formed and also helps to reduce the normal hazards of working with a hydrogen furnace. In those cases in which amounts of 3% of lanthanum are used in the doping of the titanate the ratio of helium to hydrogen can be as much as eight to one.

Figure 4:
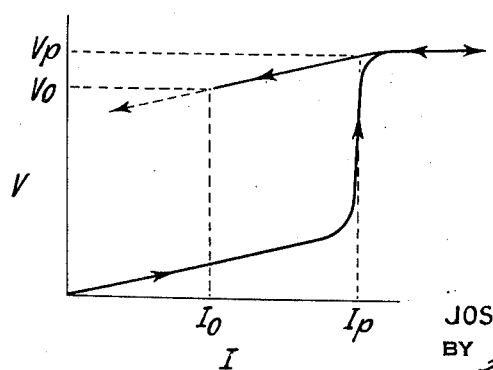
Figure 4 is a curve illustrating current voltage relationship during the formation of a barrier layer.

A preferred manner of forming a satisfactory barrier layer 12 involves two separate steps. The first is conditioning of the surface and the second plating. Both of these operations, however, may be carried out in the same bath. A current voltage relationship which is obtained when a ceramic titanate pellet is introduced as the anode in an electrolytic cell is illustrated in Figure 4 of the drawings. As the current is slowly increased a point is reached at which the voltage rises rather suddenly. At this point the pellet is polarized, that is to say, anodically oxidized. It is not necessary that any metallic salts be present in the cell for this to occur. It has, however, been found that after the surface has been polarized it has been properly "conditioned" to accept a further layer of lead dioxide which will rectify.

The second step is plating. It is important, however, that the surface be polarized in addition to being merely plated. A plate which is laid down over an unpolarized surface even when subsequently formed electrolytically results in a pellet with a very low breakdown voltage. The main purpose of plating is to permit the formation of a better barrier layer than can be achieved with oxidation alone. Although there are several different plating baths which can be used advantageously lead nitrate bath has been found to give excellent results. A suitable bath can be prepared by mixing together 250 grams of lead nitrate, 50 cc. of concentrated nitric acid and sufficient water to make one liter of solution.

Although the polarization of the surface can be carried out in a nitric acid solution followed by plating in a lead plating lead nitrate solution the latter may be used to accomplish both steps in one operation. It has been found that the pellets may vary widely in the value of $I_p$ Figure 4 but that maximum practical polarizing voltages generally lie in the range of 35 to 40 volts. Therefore, the coating technique emphasizes this voltage, rather than current. After polarization has taken place the voltage is cut back by 3 to 6 volts to the operating value, $V_o$ used for the plating step. The plating is then allowed to continue for zero to ten minutes and takes place at a fixed voltage $V_o$ and at an operating current $I_o$ the value of which falls with time. A lead dioxide layer of a mere few molecular layers is sufficient. If the operating voltage is too close to $V_p$ sparking occurs on the pellet surface and the resulting plate is unsatisfactory. If $V_o$ is greater than $V_p$ the principal reaction at the anode consists of attack on the pellet turning it white and rendering it almost useless as a rectifier. After plating the pellet it is preferably rinsed and dried in hot air. A pellet which has been formed in accordance with the above description has rectifying properties. However, at best its breakdown voltage lies in the neighborhood of 40 volts.

It has been found that this breakdown voltage can be raised considerably if a second layer 14 is applied. This can be done very simply by applying the metallic oxide powder to the top of the coating 12. It has been found to be preferable to apply this layer in the form of a paste which has been formed by intimately mixing the metal oxide powder for example, lead dioxide, in a binder. A form which has been found suitable is a paste which consists of approximately 50% or more of the commercial lead dioxide and a silicone cement. This paste is painted on to the plated layer and is allowed to dry thoroughly. Although various cement bases have been used successfully including different organic cements and several grades of silicates the organic cements are not normally considered acceptable because they as a rule have very poor thermal characteristics. Once the cement paste layer has been completely dried the cemented layer is then preferably coated with a counter electrode 16. The Fiore alloy spray gun has been found to give very excellent results producing adherent counter electrodes which have lower contact resistances than either electroplated or powder sprayed electrodes. This alloy spray can also give both results as a base electrode which is sprayed directly onto the bottom surface of the ceramic disc 10 as shown in the drawings at 18.

In those cases in which the reverse breakdown voltages of the cemented layer pellets are below 100 volts it has been found that forming techniques can be used to increase the reverse breakdown voltage to at least 100 volts D. C. In some instances much higher breakdown voltages can be attained, by these forming techniques. However, a corresponding decay of the forward characteristic may make these units which have the exceptionally high breakdown voltages undesirable. The forming can be done by rapidly A. C. pulsing at high voltages for very short periods of time. This procedure is difficult to control and may in some instances result in complete breakdown of the rectifier to a linear resistor. D. C. forming is carried out by gradually building up the reverse D. C. voltage until the breakdown point is reached whereupon the voltage is decreased immediately. This cycle may be repeated until a breakdown voltage of 100 volts or any other desired point is reached. The preferred method, however, is the one which can be referred to as A. C. forming. In this case a variable resistor is used in series with a rectifier pellet with a full resistance in the line. The A. C. applied voltage is gradually built up until some leakage begins to occur in the reverse direction. As soon as the leakage ceases the resistance in series is very slowly decreased until all resistances are out of the circuit. In cases where the leakage becomes excessive while the resistance is being decreased the applied voltage is decreased. All resistance put into the line and the cycle is repeated. After one to four cycling operations the final applied voltage is 70 volts no load or about 43 volts with. This method has been found most successful since it can be followed visually and can be controlled rather closely. The rectifier formed in this manner is quite stable.

While the above description and drawings submitted herewith disclose a preferred and practical embodiment of the titanate rectifier of this invention it will be understood that the specific details of construction and arrangement of parts as shown and described are by way of illustration and are not to be construed as limiting the scope of the invention.

What is claimed is:

1. A rectifier comprising a reduced titanate of an alkaline earth metal having a double layer on one surface thereof, said double layer consisting of an electrolytically deposited metal oxide coated with a paste consisting of a mixture of metal oxide powder and an insulating binder.

2. A rectifier comprising a reduced titanate of an alkaline earth metal having a double layer on one surface thereof, said double layer consisting of an electrolytically deposited lead dioxide layer coated with a paste consisting of a mixture of metal oxide powder and an insulating binder.

3. A rectifier comprising a reduced titanate of an alkaline earth metal having a double layer on one surface thereof, said double layer consisting of an electrolytically deposited lead dioxide coated with a paste consisting of a mixture of lead dioxide and an insulating binder.

4. A rectifier comprising a reduced titanate of an alkaline earth metal having a double layer on one surface thereof, said double layer consisting of an electrolytically deposited metal oxide coated with a paste consisting of a mixture of metal oxide powder and silicone binder.

5. A rectifier comprising a reduced titanate of an alkaline earth metal having a double layer on one surface thereof, said double layer consisting of electrolytically deposited lead dioxide coated with a paste consisting of a mixture of a metal oxide powder and a silicone binder.

6. A rectifier comprising a reduced titanate of an alkaline earth metal having a double layer on one surface thereof, said double layer consisting of electrolytically deposited lead dioxide coated with a paste consisting of a mixture of lead dioxide powder and a silicone binder.

7. A rectifier comprising a reduced titanate of an alkaline earth metal having a double layer on one surface thereof, said double layer consisting of electrolytically deposited lead dioxide coated with a paste consisting of a mixture of lead dioxide powder and a silicate binder.

8. A rectifier comprising a reduced titanate of an alkaline earth metal having a double layer on one surface thereof, said double layer consisting of electrolytically deposited metal oxide coated with a paste consisting of a mixture of said metal oxide powder and a silicate binder.

9. In a rectifier an electrode in contact with one surface of a reduced titanate of an alkaline earth metal, a metal oxide barrier layer in contact with an oppositely disposed surface of said titanate, a coating on said metal oxide barrier layer consisting of a mixture of metal oxide powder and an insulating binder, and a counter electrode in contact with said coating.

10. In a rectifier an electrode in contact with one surface of a reduced titanate of an alkaline earth metal, a lead dioxide barrier layer in contact with an oppositely disposed surface of said titanate, a coating on said lead dioxide barrier layer consisting of a mixture of metal oxide powder and an insulating binder, and a counter electrode in contact with said coating.

11. In a rectifier an electrode in contact with one surface of a reduced titanate of an alkaline earth metal, a lead dioxide barrier layer in contact with an oppositely disposed surface of said titanate, a coating on said lead dioxide barrier layer consisting of a mixture of lead dioxide powder and an insulating binder, and a counter electrode in contact with said coating.

12. In a rectifier an electrode in contact with one surface of a reduced titanate of an alkaline earth metal, a metal oxide barrier layer in contact with an oppositely disposed surface of said titanate, a coating on said metal oxide barrier layer consisting of a mixture of metal oxide powder and a silicone binder, and a counter electrode in contact with said coating.

13. In a rectifier an electrode in contact with one surface of a reduced titanate of an alkaline earth metal, a lead dioxide barrier layer in contact with an oppositely disposed surface of said titanate, a coating on said lead dioxide barrier layer consisting of a mixture of a metal oxide powder and a silicone binder, and a counter-electrode in contact with said coating.

14. In a rectifier an electrode in contact with one surface of a reduced titanate of an alkaline earth metal, a lead dioxide barrier layer in contact with an oppositely disposed surface of said titanate, a coating on said lead dioxide barrier layer consisting of a mixture of lead dioxide powder and a silicone binder, and a counter electrode in contact with said coating.

15. In a rectifier an electrode in contact with one surface of a reduced titanate of an alkaline earth metal, a lead dioxide barrier layer in contact with an oppositely disposed surface of said titanate, a coating of said lead dioxide barrier layer consisting of a mixture of lead dioxide powder and a silicate binder, and a counter electrode in contact with said coating.

16. In a rectifier an electrode in contact with one surface of a reduced titanate of an alkaline earth metal, a metal oxide barrier layer in contact with an oppositely disposed surface of said titanate, a coating of said metal oxide barrier layer consisting of a mixture of metal oxide powder and a silicate binder, and a counter electrode in contact with said coating.

17. In the manufacture of a titanate rectifier, the steps including introducing a body of reduced alkaline earth metal titanate as an anode in a bath containing a lead salt which plates out lead dioxide, operating said bath at a current density sufficient to anodically oxidize a surface of said anode and to condition said surface to receive said lead dioxide, operating said anode at a reduced current density sufficient to electrolytically deposit a layer of said lead dioxide onto said surface, and cementing a further layer of lead dioxide onto the electrolytically-deposited layer.

18. In the manufacture of a rectifier having a body of a reduced alkaline earth metal titanate, the steps including anodically oxidizing the surface of said body to condition said surface to receive a lead dioxide layer, electrolytically depositing a lead dioxide layer on said conditioned surface by placing said body in an electrolyte containing a salt capable of producing said lead dioxide, and coating the electrolytically deposited lead dioxide layer with a further layer of said lead dioxide.

19. A titanate rectifier including a body of a reduced alkaline earth metal titanate, said body having a surface conditioned by anodic oxidation, a metallic-oxide layer plated onto said surface, and a coating on said layer of said metallic oxide suspended in an insulating binder.

20. A titanate rectifier including a body of a reduced alkaline earth metal titanate, said body having a surface conditioned by anodic oxidation, a metallic oxide layer electrolytically deposited onto said surface, and a coating of said metallic oxide cemented onto said electrolytically deposited layer.

21. A titanate rectifier including a body of a reduced alkaline earth metal titanate, said body having a surface conditioned by anodic oxidation, a lead dioxide layer plated onto said surface, and a coating on said layer of said lead dioxide suspended in an insulating binder.

22. A titanate rectifier including a body of a reduced alkaline earth metal titanate, said body having a surface conditioned by anodic oxidation, a lead dioxide layer electrolytically deposited onto said surface, and a coating of said lead dioxide cemented onto said electrolytically deposited layer.

References Cited in the file of this patent

UNITED STATES PATENTS

| | | |
|---|---|---|
| 1,678,824 | Ruben | July 31, 1928 |
| 1,706,951 | Benner | Mar. 26, 1929 |
| 2,299,228 | Gray et al. | Oct. 20, 1942 |
| 2,504,178 | Burnham et al. | Apr. 18, 1950 |
| 2,618,579 | Brajer | Nov. 18, 1952 |
| 2,633,543 | Howatt | Mar. 31, 1953 |
| 2,711,469 | Ruben | June 21, 1955 |